US 9,729,434 B2

(12) United States Patent
Hathorn et al.

(10) Patent No.: US 9,729,434 B2
(45) Date of Patent: Aug. 8, 2017

(54) PROCESSING REQUESTS FOR SERVICES IN A SERVICE REQUEST AT A RECEIVING CONTROLLER AND PROCESSING CONTROLLER IN A SWITCH

(71) Applicant: International Business Machines Corporation, Armonk, NY (US)

(72) Inventors: Roger G. Hathorn, Tucson, AZ (US); Henry J. May, Rochester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 342 days.

(21) Appl. No.: 13/862,247

(22) Filed: Apr. 12, 2013

(65) Prior Publication Data
US 2014/0307741 A1    Oct. 16, 2014

(51) Int. Cl.
*H04L 12/717* (2013.01)
*H04L 12/931* (2013.01)
*H04L 12/24* (2006.01)

(52) U.S. Cl.
CPC ............. *H04L 45/42* (2013.01); *H04L 41/00* (2013.01); *H04L 49/357* (2013.01)

(58) Field of Classification Search
None
See application file for complete search history.

(56) References Cited

U.S. PATENT DOCUMENTS

| | | | | |
|---|---|---|---|---|
| 6,405,289 | B1 * | 6/2002 | Arimilli et al. | 711/145 |
| 8,948,176 | B1 * | 2/2015 | Desanti | H04L 45/44 370/351 |
| 2005/0238353 | A1 * | 10/2005 | McGlaughlin | H04L 49/357 398/45 |
| 2012/0106957 | A1 * | 5/2012 | Willeke | H04L 29/12207 398/58 |

OTHER PUBLICATIONS

S. Wilson, et al., "Fibre Channel Switch Fabric—6 (FC-SW-6) Rev. 1.2", INCITS working draft proposed American National Standard for Information Technology, Feb. 1, 2013, pp. 1-385.
S. Wilson, et al., "Fibre Channel Link Services (FC-LS-2) Rev. 2.21", INCITS working draft proposed American National Standard for Information Technology, Aug. 2, 2010, pp. 1-199.

* cited by examiner

*Primary Examiner* — Hassan Phillips
*Assistant Examiner* — Ayanah George
(74) *Attorney, Agent, or Firm* — David W Victor; Konrad Raynes Davda & Victor LLP

(57) ABSTRACT

Provided are a computer program product, system, and method for processing requests for multiple services in a service request. A receiving controller, comprising one of a controlling forwarder or a data forwarder, receives a service request for a service from an originating device node. The receiving controller forwards an internal service request to a processing controller providing response information for the service request. The processing controller comprises a data forwarder when the receiving controller comprises the controlling forwarder or comprises the controlling forwarder when the receiving controller comprises one of the at least (Continued)

one data forwarder. The processing controller processes the internal service request to generate response information requested by the service request and forwards a reply including the response information to the receiving controller, which forwards the response information in a reply to the service request to the originating device node.

21 Claims, 6 Drawing Sheets

Internal Service Request

Service Request Descriptor

Service Request Context Association

PROCESSING REQUESTS FOR SERVICES IN A SERVICE REQUEST AT A RECEIVING CONTROLLER AND PROCESSING CONTROLLER IN A SWITCH

BACKGROUND OF THE INVENTION

1. Field of the Invention

The present invention relates to a computer program product, system, and method for processing requests for services in a service request at a receiving controller and processing controller in a switch.

2. Description of the Related Art

A distributed switch includes a plurality of interconnected forwarders that provide ports to interconnect device nodes. In a distributed Fibre Channel over Ethernet (FCoE) forwarder, a controlling FCoE forwarder (cFCF) is in communication with one or more FCoE data forwarders (FDFs) over an Ethernet network. The cFCF and connected FDFs provide Fibre Channel connections to device nodes in a Fibre Channel Fabric.

Distributed switches separate the control and data forwarding aspects of a Fibre Channel Switch into separate elements called Controlling Switches (cSW), also referred to as controlling forwarders, and Fibre Channel Data Forwarders (FCDFs). Controlling Switches (controlling forwarders) and FCDFs are interconnected through Fibre Channel links or Lossless Ethernet fabrics in the case of FCoE. The technology allows for centralized control and management of the SAN in the controlling switch, and localized switching and forwarding of data between devices connected to the FCDFs without having to traverse the core of the fabric (the controlling switch).

A distributed switch is also referred to as a Virtual Domain as it virtualizes the existence of a Fibre Channel switch which provides a Fibre Channel Domain in the SAN.

A distributed switch provides separation of the entities that provide Fibre Channel services to the end devices. The F_Port Controller resides in the FCDFs and other services remain in the controlling switch (Fabric controller, Domain Controller, Name Server, etc). The Fibre Channel Link Services standard provides a set of Extended Link Services (ELS) that are used by end devices (such as servers or storage devices) to operate within the SAN and to provide information to upper level services or applications for management of the devices in the SAN. Some of these Link Services are provided by the F_Port Controller, and others are provided by the fabric controller, name server or the domain controller in the controlling forwarder. An ELS request is addressed specifically to the provider of the service as indicated in the addressing specification for each of the link services.

SUMMARY

Provided are a computer program product, system, and method for processing requests for multiple services in a service request. A receiving controller, comprising one of a controlling forwarder or a data forwarder, receives a service request for a service from an originating device node. The receiving controller forwards an internal service request to a processing controller providing response information for the service request. The processing controller comprises a data forwarder when the receiving controller comprises the controlling forwarder or comprises the controlling forwarder when the receiving controller comprises one of the at least one data forwarder. The processing controller processes the internal service request to generate response information requested by the service request and forwards a reply including the response information to the receiving controller, which forwards the response information in a reply to the service request to the originating device node.

DETAILED DESCRIPTION

Some service requests, such as Extended Link Service (ELS) request may be addressed to multiple services depending on the scope of the requested service. By separating the function of the F_Port controller geographically from the other services in the controlling forwarder some of the requested services may not be able to be completely processed by the component in the distributed switch receiving the requested service, such as the controlling forwarder, also known as the controlling switch, or the data forwarder. In some cases the data forwarder needs information from the controlling switch in order to complete a request addressed to the F_Port controller. In other cases the controlling switch requires information from the data forwarder in order to complete a request addressed to the Domain or Fabric controllers.

Described embodiments provide a messaging technique for a receiving controller, such as one of the data forwarders or controlling forwarder, receiving a service request including a request for services not maintained at the receiving controller, to forward the request to a processing controller in the distributed switch that can provide the requested service not available at the receiving controller.

Figure 1:
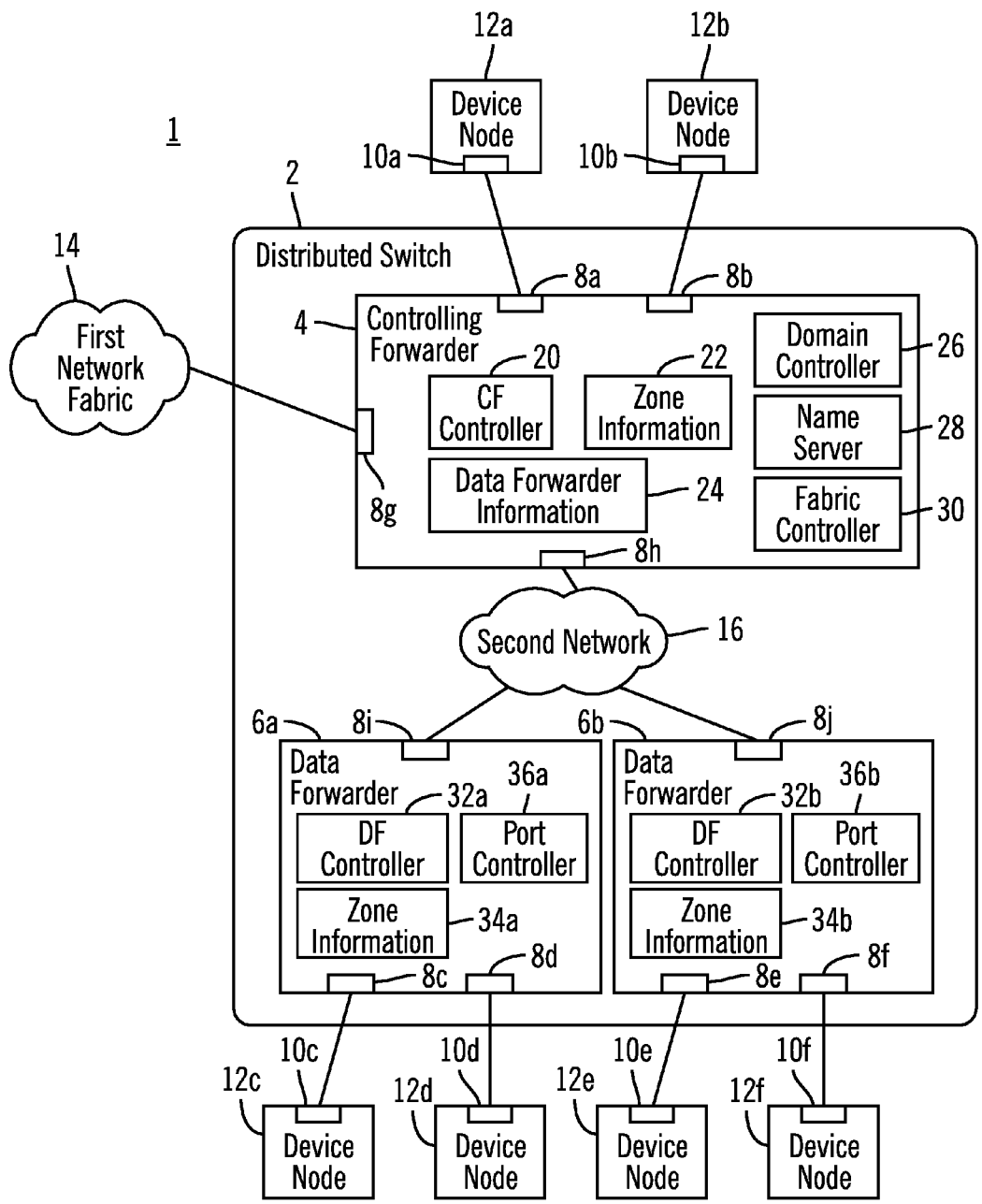
FIG. 1 illustrates an embodiment a distributed switch.

FIG. 1 illustrates an embodiment of a network computing environment 1 including a distributed switch 2 comprised of a controlling forwarder 4 and one or more data forwarders 6a, 6b. The forwarders 4, 6a, 6b include ports 8a, 8b, 8c, 8d, 8e, 8f, to connect the distributed switch 2 to ports 10a, 10b, 10c, 10d, 10e, 10f of device nodes 12a, 12b, 12c, 12d, 12e, 12f, respectively, and a port 8g connecting to a first network fabric 14 having further device nodes. The controlling forwarder 4 communicates via port 8h with the data forwarders over a second network 16 via data forwarder ports 8i and 8j. The device nodes 12a, 12b, 12c, 12d, 12e, 12f may comprise server and storage nodes that communicate over the first network fabric 14 through the distributed switch 2.

The controlling forwarder 4 includes a controlling forwarder (CF) controller 20 to perform the controlling forwarder 4 operations; zone information 22 providing information on ports in the network and the ports with which each port may communicate; data forwarder information 24 on the data forwarders 6a, 6b in the distributed switch 2; a domain controller 26 for handling requests in domains configured in the first network fabric 14; a name server 28 for resolving names in the first network fabric 14; and a fabric controller 30 to manage the configuration of components in the first network fabric 14.

Each data forwarder 6a, 6b includes a data forwarder (DF) controller 32a, 32b, zone information 34a, 34b providing information on ports in the network and the ports with which each port may communicate; and a port controller 36a, 36b, such as an F port or VF port controller for managing F or VF ports 8c, 8d, 8e, 8f that provide connections to end point devices 10c, 10d, 10e, 10f.

The controlling forwarder 4 manages zone information of ports that may communicate with other ports in the network 1 for the distributed switch 2. When ports are allocated and deallocated in the network 1, the controlling forwarder 4 transmits information on the port updates to the data forwarders 6a, 6b so that the data forwarders 6a, 6b may update their local zone information 28a, 28b. The data forwarders 6a, 6b use their local zone information 28a, 28b to determine whether a device node port 10a-10f, transmitting data or a message, may communicate with a target port of the communication.

Although two data forwarders 6a, 6b are shown, there may be additional data forwarders in the distributed switch 2 managed by the controlling forwarder 4 and/or additional controlling forwarders. Further, there may be multiple controlling forwarders 4 to provide redundancy of this component, where the multiple controlling forwarders may be connected to each of the data forwarders 6a, 6b to provide redundancy. Further, the distributed switch 2 may connect to additional distributed switches in the network. The device nodes 12a-12f may comprise servers, initiators, targets, storage devices, etc.

The first network fabric 14 may comprise a Fibre Channel Fabric. The forwarders 4, 6a, 6b may communicate with the device nodes 12a-12f using Fibre Channel protocols. The second network 16 may comprise an Ethernet network, such that the controlling forwarder 4 and data forwarders 6a, 6b communicate using a Fibre Channel over Ethernet (FCoE) protocol. In such Fibre Channel embodiments, the distributed switch 2 may comprise a distributed FCoE forwarder (Distributed FCF), the controlling forwarder 4 may comprise a controlling FCoE forwarder (cFCF), and the data forwarders 6a, 6b may comprise FCoE data plane forwarders (FDFs). The ports may comprise physical ports or virtual ports providing Fibre Channel links. In certain embodiments, the ports 8h, 8i, and 8j connecting the forwarders 4, 6a, 6b may comprise Fibre Channel Virtual A ports (VA Ports), providing virtual links. The ports 8a, 8b, 8c, 8d, 8e, 8f may comprise F ports or virtual F ports (VF) that connect to end point devices 10a . . . 10f.

The CF 20 and DF 32a, 32b controllers may be implemented as an application specific integrated circuit (ASIC) or a processor executing computer readable program instructions in a non-volatile storage, or a combination thereof. In this way, the controllers 20, 32a, 32b include hardware to execute code or logic to perform the operations described herein. The controllers 20, 32a, 32b may include a volatile or non-volatile memory to store zone information 22, 34a, 34b, data forwarder information 24, and other information used during processing.

In described embodiments, a receiving controller, comprising the CF controller 20 or one of the DF controllers 32a, 32b, receives a service request, such as a Fibre Channel Extended Link Service (ELS) request, from one of the end point device nodes 12a . . . 12f. The ELS request may request certain information on ports and the fabric 14 and address one or more services which may reside in the receiving controller or a processing controller. For instance, if the receiving controller comprises the data forwarder 6a, 6b, then the processing controller may comprise the controlling forwarder 4. Likewise, if the controlling forwarder 4 comprises the receiving controller, the processing controller may comprise the data forwarder 6a, 6b. The requested services may comprise the port controller 36a, 36b or the domain controller 30, name server 24 or fabric controller 28. For instance, if the receiving controller comprises the controlling forwarder 4, then the service request may request information about an F port 8c, 8d, 8e, 8f which needs to be serviced by one of the port controllers 36a, 36b in one of the data forwarders 6a, 6b. Similarly, if the receiving controller comprises a data forwarder 6a, 6b, then the service request may require information from one of the services in the controlling forwarder 4, such as the domain controller 26, name server 28 or fabric controller 30.

In described embodiments, a service may comprise a program module or component or information or objects that an end device wants to invoke and/or access. A service request may request one or more services that are available in different of the switch 2 components 4, 6a, 6b.

Figure 2:
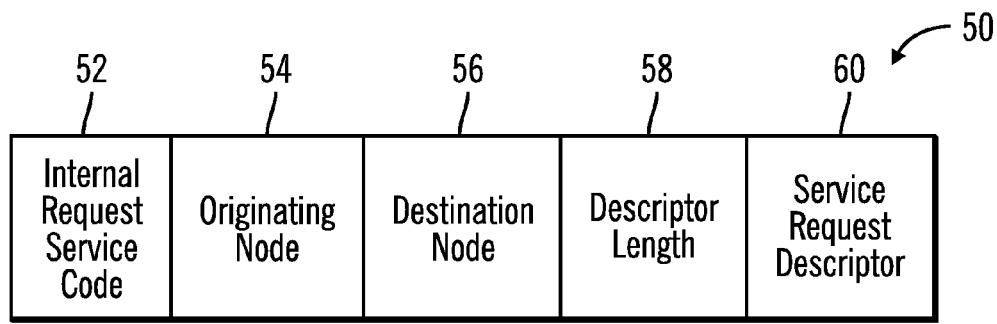
FIG. 2 illustrates an embodiment of an internal service request.

FIG. 2 illustrates an embodiment of an internal service request 50 that the receiving controller needs to forward to the processing controller to access information needed to respond to a service request. The internal service request 50 may comprise an internal link service (ILS) request in a Fibre Channel implementation used to exchange information between the controlling forwarder 4 and the data forwarders 6a, 6b. The internal service request 50 may include an internal service request code 52 identifying the message; an originating node 54 comprising the receiving controller 4, 6a, 6b receiving the service request; a destination node 56 indicating a processing controller in the distributed switch 2 to gather response information for the service request; a descriptor length 58 comprising a length of a service request descriptor 60 having information on the received service request to enable the destination node 56 to process.

Figure 3:
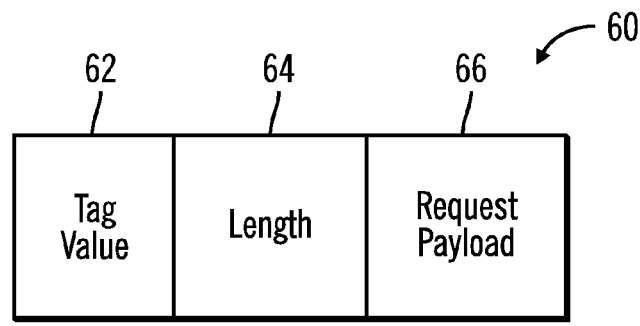
FIG. 3 illustrates an embodiment of a service request descriptor.

FIG. 3 illustrates an embodiment of the service request descriptor 60 as including a tag value 62; a length 64 of a request payload 66 indicating the service request. In a Fibre Chanel embodiment, the request payload 66 may comprise an ELS request, link service accept (LS_ACC), or link service reject (LS_RJT) payload.

Figure 4:
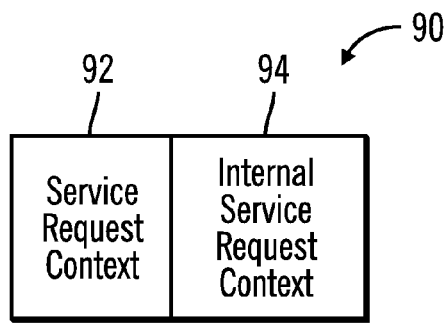
FIG. 4 illustrates an embodiment of a service request context association.

FIG. 4 illustrates an embodiment an a service request context association 90 that provides a service request context 92 created to provide information on a service request, such as the originating device node 10a . . . 10f, the type of service request, addressed component, etc., and an associated internal service request 94 providing information on an internal service request sent by the receiving controller to the processing controller to gather information for the service request that can only be obtained on the processing controller.

Figure 5:
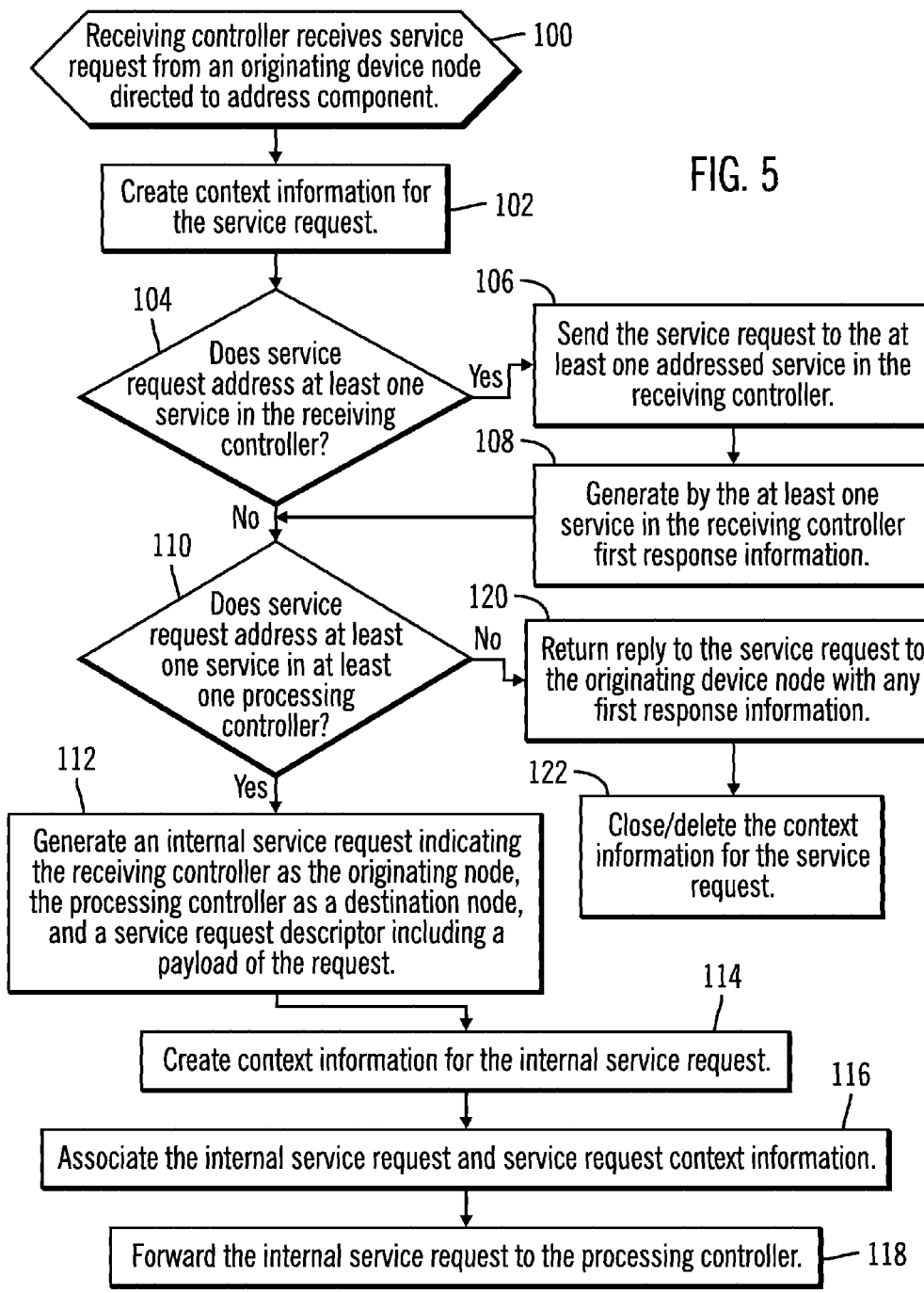
FIG. 5 illustrates an embodiment of receiving controller operations to process a service request.

FIG. 5 illustrates an embodiment performed in the receiving controller code, which may comprise the code implemented in the CF controller 20 and the DF controller 32a, 32b to process a service request from a device node 12a . . . 12f. Upon the receiving controller receiving a service request from an originating device, which may be directed to one or more services, such as an ELS request, the receiving controller creates (at block 102) context information 92 for the service request, including such information as the type of request, originating device node, port upon which the originating device 10a . . . 10f communicated, requested services, etc. If (at block 104) the service request addresses at least one service in the receiving controller, then the receiving controller sends (at block 106) the service request to the at least one addressed service 26, 28, 30, 36a, 36b in the receiving controller 4, 6a, 6b. The at least one service in the receiving controller generates (at block 108) first response information when processing the service request. The first response information may comprise data or information on ports or other components in the network 14 or comprise an acknowledgment or status of performing an operation requested by the service request.

From block 108 or the no branch of block 104, if (at block 110) the service request addresses at least one service in at least one processing controller, then the receiving controller generates (at block 112) an internal service request 50 indicating the receiving controller as the originating node 54, the processing controller as a destination node 56, and a service request descriptor 60 including a payload of the request. Context information 94 is created (at block 114) for the internal service request 50 and the internal service request 94 and service request 92 context information are associated (at block 116) in an association 90 (FIG. 4). The receiving controller forwards (at block 118) the internal service request 50 to the at least one processing controller. In this way, a service request can address services and information in the receiving controller and/or at least one processing controller.

If (from the no branch of at block 110) the service request does not address a service in an external processing controller and all the information or actions required by the service request can be obtained from the receiving controller, such as if the addressed service is in the receiving controller, then the receiving controller returns (at block 120) a reply to the service request including any first response information and then closes/deletes (at block 122) the context information 92 created for the service request.

For instance, if the service request is sent to the controlling forwarder 4 and is directed to the port controller 36a, 36b service for information on a port 8c, 8d, 8e, 8f, such as status, usage statistics, etc., then the service request requires information from the port controller 36a, 36b service in the data forwarder 6a, 6b having the port for which information is required. Alternatively, if the service request is sent to a data forwarder 6a, 6b for information on a port not at the receiving data forwarder 6a, 6b or the fabric 14, then the service request requires information from a service in the controlling forwarder 4, such as the domain controller 26, name server 28 or fabric controller 30, which service may be addressed in the service request.

Figure 6:
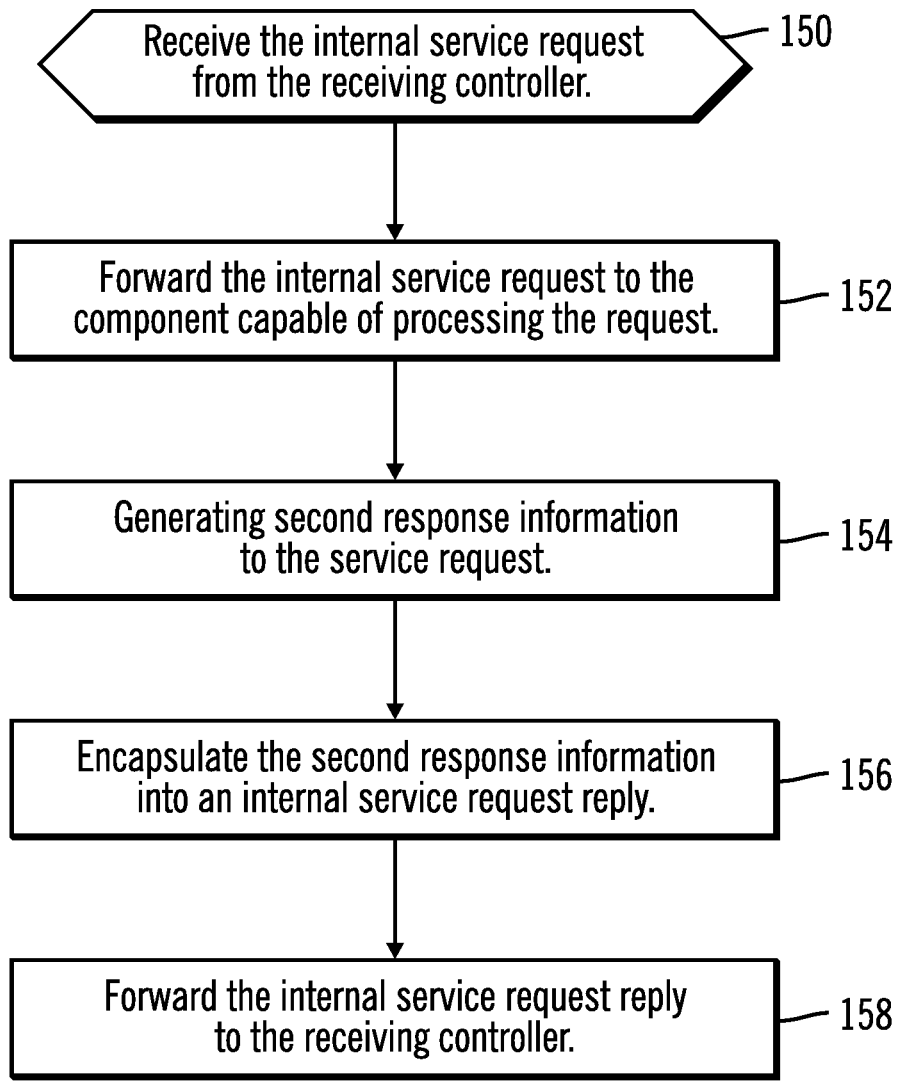
FIG. 6 illustrates an embodiment of processing controller operations to process an internal service request for a service at the processing controller.

FIG. 6 illustrates an embodiment of operations performed in the processing controller code, which may comprise the code implemented in the CF controller 20 and the DF controller 32a, 32b, to process an internal service request 50 from a receiving controller sent according to the operations of FIG. 5. The internal service request 50 is forwarded (at block 152) to the component in the processing controller capable of processing the service request indicated in the descriptor 50, such as the domain controller 26, name server 28 fabric controller 30 or port controller 36a, 36b. The service in the processing controller, addressed in the service request descriptor 60, generates (at block 154) second response information to the service request, such as gathering information on an identified port, indicating a status of a requested operation, etc. The generated second response information is encapsulated (at block 156) into an internal service request reply and then forwarded (at block 158) to the receiving controller. The internal service request reply may include the information in FIG. 2, including a reply code 52, the originating node 54 as the processing controller, the destination node 56 as the receiving controller and the reply payload, such as the requested information and/or an acceptance acknowledgment or a rejection.

Figure 7:
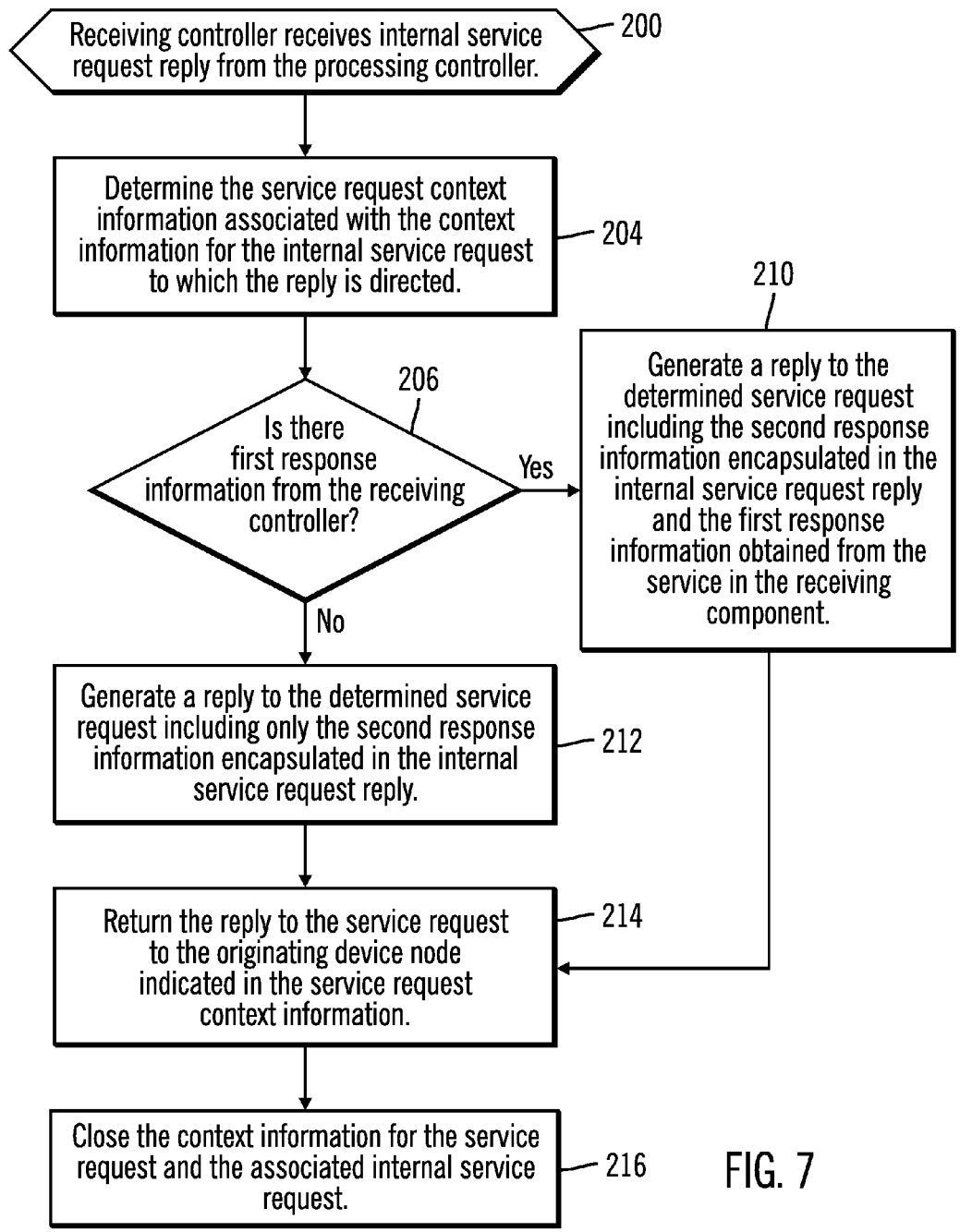
FIG. 7 illustrates an embodiment of receiving controller operations to process a reply to the internal service request with information for the service request.

FIG. 7 illustrates an embodiment performed in the receiving controller code, which may comprise the code implemented in the CF controller 20 and the DF controller 32a, 32b, to process a reply to the internal service request 50 sent according to the operations of FIG. 6. Upon the receiving controller receiving the internal service request reply from the processing controller, a determination is made (at block 204) of the service request context information 92 associated with the context information for the internal service request 94 to which the received reply is directed. If (at block 206) there is first response information from a service at the receiving controller, then the receiving controller generates (at block 210) a reply to the determined service request including the second response information encapsulated in the internal service request reply and the first response information obtained by executing the service request in the receiving component to provide combined response information to return to the service request.

If (at block 206) there is no information to obtain from the receiving controller, then the receiving controller generates (at block 212) a reply to the determined service request including only the second response information encapsulated in the internal service request reply. The reply to the service request generated at block 210 or 212 is returned (at block 214) to the originating device node indicated in the service request context information 92. The associated context information 90 for the service request 92 and the associated internal service request 94 is deleted/closed (at block 216)

In Fibre Channel (FC) embodiments, the service request may comprise an ELS from a VN_Port on one of the device nodes 12a . . . 12f that is addressed to an address of a service provided in the FC controlling forwarder 4, which may require information from the FC data forwarder 6a, 6b that contains the VF_Port associated with requested information. The receiving FC controlling forwarder 4, operating as the receiving controller, may encapsulate the received ELS into a Distributed ELS (DELS) Switch Internal Link Service (SW_ILS), such as the internal service request shown in FIG. 3, and send the DELS to the VA_Port controller of the FC data forwarder 6a, 6b owning the VF_port 8c, 8d, 8e, 8f for which the information is requested. The VA_Port controller 36a, 36b of the FC data forwarder 6a, 6b forwards the ELS encapsulated in the DELS to the F_Port controller service for processing. The F_Port controller service provides the ELS response, such as Link Service Accept (LS_ACC) or Link Service Reject (LS_RJT) to the VA_Port controller. The VA_Port controller encapsulates the ELS response into a SW_ACC or SW ILS and transmits the response to the FC controlling forwarder 4. Upon receipt of the SW_ACC response to the DELS, the content of the encapsulated ELS response is transmitted to the requesting VN_Port. Depending on the ELS provided, the controlling forwarder 4 may include additional information or modify information in the provided ELS response.

In FC embodiments, when the ELS is from a VN_Port that is addressed to a well known address of a service provided in the FC data forwarder 6a, 6b, the FC data forwarder 6a, 6b may require information from the FC controlling forwarder 4 to complete the request. In this case, the received ELS may be encapsulated into a Distributed ELS (DELS) SW_ILS and sent to the VA_Port controller of the owning FC controlling forwarder 4 for processing. The VA_Port controller of the FC controlling forwarder 4 may forward the ELS encapsulated in the DELS to the required service (e.g. domain controller 26, name server 28, fabric controller 30 for processing. The FC controlling forwarder 4 provides the ELS response (LS_ACC or LS_RJT) to the VA_Port controller. The VA_Port controller encapsulates the ELS response into a SW_ACC SW ILS and transmits the response to the FC data forwarder 6a, 6b. Upon receipt of the SW_ACC response to the DELS, the content of the encapsulated ELS response is transmitted by the FC data forwarder 6a, 6b to the requesting VN_Port in the end device 10a . . . 10f. Depending on the ELS provided, the FC data forwarder 6a, 6n may include additional information or modify information in the provided ELS response.

Figure 8:
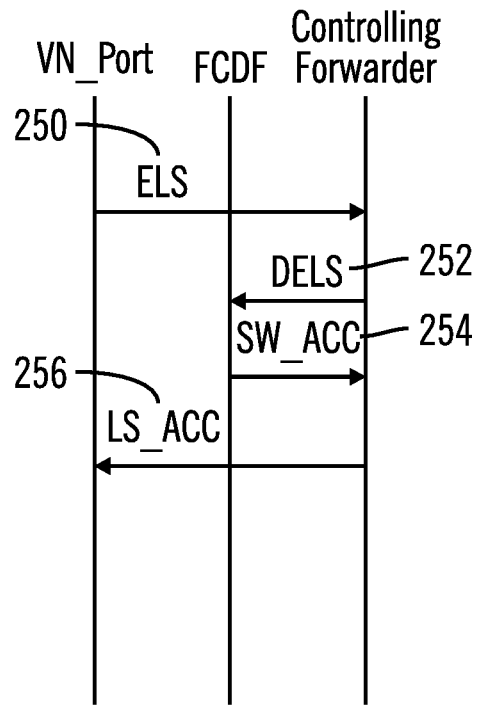
FIGS. 8 and 9 illustrate embodiments of message flows to process a service request to a distributed switch.

FIG. 8 illustrates a message flow diagram showing the initial service request (ELS) 250 coming from the VN_Port on a device node 12a . . . 12f that is sent to the controlling forwarder 4. The controlling forwarder 4 forms an internal service request or DELS 252 to the FC data forwarder ("FCDF") including a requested service in the FCDF, which includes the entire ELS frame content. The SW_ACC response 254 contains the LS_ACC or LS_RJT. The ELS response or LS_ACC 256 is sent by the controlling forwarder 4 to the requesting VN_port upon receipt of the SW_ACC response from the FCDF including information from the service on the FCDF.

Figure 9:
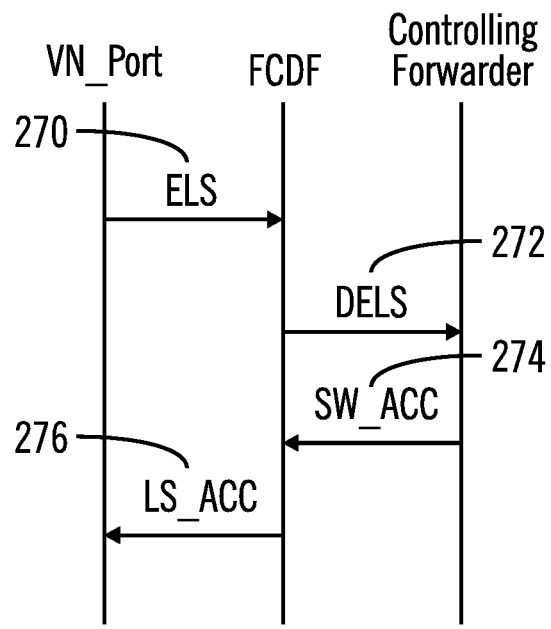

FIG. 9 illustrates a message flow diagram showing the initial service request (ELS) 270 from the VN_Port to the FCDF, which then forwards an internal service request or DELS 272 to the controlling forwarder 4 having the requested service, which returns a response or SW_ACC 274 having information, which is then included in a reply to the service request LS_ACC 276 returned to the requesting VN_Port.

Described embodiments provide techniques for processing a service request in a component in a receiving controller comprising a component in a distributed switch, such as the data forwarder or controlling forwarder, which determines that another processing controller, such as the other of the controlling forwarder or data forwarder, respectively, must further process the service request to return information needed by the service request. Described embodiments provide techniques for forwarding an internal service request to the other processing controller to gather the information that can only be obtained by the processing controller to include in a reply to the service request.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing communication among components in a distributed switch in a network having a controlling forwarder and at least one data forwarder, wherein device nodes connect to the distributed switch to communicate over the network, the computer program product comprising a non-transitory computer readable storage medium having computer readable program code including code to cause a receiving controller and a processing controller to perform operations, the operations comprising:

receiving, by the receiving controller comprising one of the controlling forwarder or the data forwarder, a service request for a service from an originating device node, comprising one of the device nodes, wherein the service comprises at least one of a program module and information that is addressed in the service request and that the originating device node is to invoke and/or access;

generating, by the receiving controller, context information for the service request providing information on the service request including the originating device node;

determining, by the receiving controller, whether service is in the receiving controller; sending, by the receiving controller, the service request to the service in the receiving controller in response to determining that the service is in the receiving controller;

in response to determining that the service is not in the receiving controller, performing, by the receiving controller:

generating an internal service request:

generating context information for the internal service request providing information on the internal service request:

associating the context information for the internal service request with the context information for the service request:

forwarding the internal service request to a processing controller, wherein the processing controller comprises one of the at least one data forwarder and the controlling forwarder, and wherein the internal service request indicates information to enable the processing controller to invoke and/or access the service;

processing, by the processing controller, the internal service request to generate response information requested by the service request;

forwarding, by the processing controller, a reply to the internal service request including the response information to the receiving controller; and forwarding, by the receiving controller, the response information in a reply to the service request to the originating device node indicated in the context information for the service request associated with the context information for the internal service request to which the reply is directed.

2. The computer program product of claim 1, wherein the operations of forwarding the internal service request to the processing controller, processing the internal service request, and forwarding the reply to the internal service request are additionally performed in response to the service request addressing the service in the processing controller, wherein the service in the processing controller generates the response information.

3. The computer program product of claim 2, wherein the response information from the service in the processing controller comprises first response information, wherein the operations further comprise:

forwarding, by the receiving controller, the service request to the service in the receiving controller when the service request addresses the service in the receiving controller; and generating, by the service in the receiving controller, second response information to include in the reply to the service request.

4. The computer program product of claim 2, wherein the service comprises a link service, and wherein the response information from the processing controller comprises information on a port at the processing controller.

5. The computer program product of claim 1, wherein the service request requests multiple services, including at least one service at the receiving controller and at least one service at the processing controller, wherein the response information generated at the processing controller comprises first response information, wherein the at least one service at the processing controller generates the first response information, and wherein the operations further comprise:

executing, by the at least one service at the receiving controller, the service request to generate second response information at the receiving controller; and combining the first and second response information to return in the reply to the service request to the originating device node.

6. The computer program product of claim 1, wherein the internal service request identifies the receiving controller as an originating node and the processing controller as a destination node, wherein the receiving controller further performs:

generating an association of the internal service request and the service request from the originating device node; and using the association to determine the service request for which the response information in the reply to the internal service request is intended.

7. The computer program product of claim 1, wherein the distributed switch comprises a Fibre Channel (FC) distributed switch, wherein the controlling forwarder comprises a FC controlling forwarder and the at least one data forwarder comprises at least one FC data forwarder, and wherein the service request comprises an Extended Link Service (ELS) request for a link service, and wherein the internal service request includes a descriptor of the ELS request.

8. The computer program product of claim 7, wherein the receiving controller comprises the FC controlling forwarder and the processing controller comprises one of the at least one FC data forwarder, and wherein the internal service request requires information from an F port controller at the FC data forwarder for an F port on the FC data forwarder.

9. The computer program product of claim 7, wherein the receiving controller comprises one of the at least one FC data forwarder and the processing controller comprises the FC controlling forwarder, and wherein the service request requires information from a domain controller in the FC controlling forwarder for a port not included in the receiving controller.

10. A distributed switch in a network connected to at least one device node, comprising:

a controlling forwarder including a controlling forwarder computer readable storage medium including code to cause the controlling forwarder to operate as a receiving controller and a processing controller;

at least one data forwarder connected to the controlling forwarder, wherein each data forwarder includes a data forwarder non-transitory computer readable storage medium including code to cause the data forwarder to operate as the receiving controller and the processing controller;

wherein the receiving controller and processing controller operations executed in the controlling forwarder and the at least one data forwarder comprise:

receiving, by the receiving controller implemented in one of the controlling forwarder or the data forwarder, a service request for a service from an originating device node, comprising one of the at least one device node, wherein the service comprises at least one of a program module and information that is addressed in the service request and that the originating device node is to invoke and/or access;

generating, by the receiving controller, context information for the service request providing information on the service request including the originating device node:

determining, by the receiving controller, whether service is in the receiving controller;

sending, by the receiving controller, the service request to the service in the receiving controller in response to determining that the service is in the receiving controller;

in response to determining that the service is not in the receiving controller, performing, by the receiving controller:

generating an internal service request;

generating context information for the internal service request providing information on the internal service request;

associating the context information for the internal service request with the context information for the service request;

forwarding the internal service request to a processing controller, wherein the processing controller comprises one of the at least one data forwarder and the controlling forwarder, and wherein the internal service request indicates information to enable the processing controller to invoke and/or access the service; processing, by the processing controller, the internal service request to generate response information requested by the service request;

forwarding, by the processing controller, a reply to the internal service request including the response information to the receiving controller; and forwarding, by the receiving controller, the response information in a reply to the service request to the originating device node indicated in the context information for the service request associated with the context information for the internal service request to which the reply is directed.

11. The distributed switch of claim 10, wherein the operations of forwarding the internal service request to the processing controller, processing the internal service request, and forwarding the reply to the internal service request are additionally performed in response to the service request addressing the service in the processing controller, wherein the service in the processing controller generates the response information.

12. The distributed switch of claim 11, wherein the response information from the service in the processing controller comprises first response information, wherein the operations further comprise:

forwarding, by the receiving controller, the service request to the service in the receiving controller when the service request addresses the service in the receiving controller; and generating, by the service in the receiving controller, second response information to include in the reply to the service request.

13. The distributed switch of claim 11, wherein the service comprises a link service, and wherein the response information from the processing controller comprises information on a port at the processing controller.

14. The distributed switch of claim 10, wherein the service request requests multiple services, including at least one service at the receiving controller and at least one service at the processing controller, wherein the response information generated at the processing controller comprises first response information, wherein the at least one service at the processing controller generates the first response information, and wherein the operations further comprise:

executing, by the at least one service at the receiving controller, the service request to generate second response information at the receiving controller; and combining the first and second response information to return in the reply to the service request to the originating device node.

15. The distributed switch of claim 10, wherein the distributed switch comprises a Fibre Channel (FC) distributed switch, wherein the controlling forwarder comprises a FC controlling forwarder and the at least one data forwarder comprises a FC data forwarder, and wherein the service request comprises an Extended Unk Service (ELS) request for a link service, and wherein the internal service request includes a descriptor of the ELS request.

16. A method for managing communication among components in a distributed switch in a network having a controlling forwarder, and at least one data forwarder, wherein at least one device node is connected to the at least one data forwarder to connect to the distributed switch, comprising:

receiving, by a receiving controller comprising one of the controlling forwarder or the data forwarder, a service request for a service from an originating device node, comprising one of the at least one device node, wherein the service comprises at least one of a program module and information that is addressed in the service request and that the originating device node is to invoke and/or access;

generating, by the receiving controller, context information for the service request providing information on the service request including the originating device node:

determining, by the receiving controller, whether the service is in the receiving controller;

sending, by the receiving controller, the service request to the service in the receiving controller in response to determining that the service is in the receiving controller;

in response to determining that the service is not in the receiving controller, performing, by the receiving controller:

generating an internal service request:

generating context information for the internal service request providing information on the internal service request:

associating the context information for the internal service request with the context information for the service request:

forwarding the internal service request to a processing controller, wherein the processing controller comprises one of the at least one data forwarder and the controlling forwarder er, and wherein the internal service request indicates information to enable the processing controller to invoke and/or access the service; processing, by the processing controller, the internal service request to generate response information requested by the service request;

forwarding, by the processing controller, a reply to the internal service request including the response information to the receiving controller; and forwarding, by the receiving controller, the response information in a reply to the service request to the originating device node indicated in the context information for the service request associated with the context information for the internal service request to which the reply is directed.

17. The method of claim 16, wherein the forwarding the internal service request to the processing controller, processing the internal service request, and forwarding the reply to the internal service request are additionally performed in response to the service request addressing the service in the processing controller, wherein the service in the processing controller generates the response information.

18. The method of claim 17, wherein the response information from the service in the processing controller comprises first response information, further comprising:

forwarding, by the receiving controller, the service request to the service in the receiving controller when the service request addresses the service in the receiving controller; and generating, by the service in the receiving controller, second response information to include in the reply to the service request.

19. The method of claim 17, wherein the service comprises a link service, and wherein the response information from the processing controller comprises information on a port at the processing controller.

20. The method of claim 16, wherein the service request requests multiple services, including at least one service at the receiving controller and at least one service at the processing controller, wherein the response information generated at the processing controller comprises first response information, wherein the at least one service at the processing controller generates the first response information, further comprising:

executing, by the at least one service at the receiving controller, the service request to generate second response information at the receiving controller; and combining the first and second response information to return in the reply to the service request to the originating device node.

21. The method of claim 16, wherein the distributed switch comprises a Fibre Channel (FC) distributed switch, wherein the controlling forwarder comprises a FC controlling forwarder and the at least one data forwarder comprises a FC data forwarder, and wherein the service request comprises an Extended Link Service (ELS) request for a link service, and wherein the internal service request includes a descriptor of the ELS request.

* * * * *